US012087211B2

(12) United States Patent
Hong et al.

(10) Patent No.: US 12,087,211 B2
(45) Date of Patent: Sep. 10, 2024

(54) ELECTROLUMINESCENT DISPLAY APPARATUS

(71) Applicant: LG Display Co., Ltd., Seoul (KR)

(72) Inventors: Seok Hyun Hong, Paju-si (KR); Sang Yun Kim, Paju-si (KR); Jae Yoon Bae, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 83 days.

(21) Appl. No.: 17/966,135

(22) Filed: Oct. 14, 2022

(65) Prior Publication Data

US 2023/0196983 A1 Jun. 22, 2023

(30) Foreign Application Priority Data

Dec. 16, 2021 (KR) ........................ 10-2021-0181004

(51) Int. Cl.
*G09G 3/32* (2016.01)

(52) U.S. Cl.
CPC ....... *G09G 3/32* (2013.01); *G09G 2300/0828* (2013.01); *G09G 2300/0852* (2013.01); *G09G 2310/0272* (2013.01); *G09G 2310/0294* (2013.01); *G09G 2310/061* (2013.01); *G09G 2310/08* (2013.01)

(58) Field of Classification Search
CPC ... G09G 2300/0828; G09G 2300/0852; G09G 2310/0272; G09G 2310/0294; G09G 2310/061; G09G 2310/08
USPC .......................................................... 345/55
See application file for complete search history.

(56) References Cited

U.S. PATENT DOCUMENTS

2018/0151124 A1* 5/2018 An ....................... G09G 3/3225

* cited by examiner

*Primary Examiner* — Amare Mengistu
*Assistant Examiner* — Gloryvid Figueroa-Gibson
(74) *Attorney, Agent, or Firm* — Morgan, Lewis & Bockius LLP

(57) ABSTRACT

An electroluminescent display apparatus may include a pixel including a driving element having a gate electrode connected to a data line and a source electrode connected to a reference voltage line and a pixel driving circuit applying a sensing data voltage to the gate electrode of the driving element through the data line, detecting a source electrode voltage of the driving element, shifted from a sensing reference voltage based on the sensing data voltage, through the reference voltage line to obtain a detection voltage, calculating an offset voltage based on the detection voltage, and lowering a level of the sensing data voltage based on the offset voltage, in a plurality of vertical blank periods.

9 Claims, 16 Drawing Sheets

<Display Driving>

<1st RT Sensing>

<2nd RT Sensing>

<nth RT Sensing>

ELECTROLUMINESCENT DISPLAY APPARATUS

CROSS-REFERENCE TO RELATED APPLICATIONS

This application claims the benefit of and priority to Korean Patent Application No. 10-2021-0181004 filed on Dec. 16, 2021, the entirety of which is incorporated herein by reference for all purposes, as if fully set forth herein.

BACKGROUND

1. Technical Field

The present disclosure relates to an apparatus and particularly to, for example, without limitation, an electroluminescent display apparatus.

2. Discussion of the Related Art

In electroluminescent display apparatuses having an active matrix, a plurality of pixels each including a light emitting device and a driving element may be arranged as a matrix, and the luminance of an image produced by the pixels may be adjusted based on a gray level of the image data. The driving element may control a pixel current flowing in the light emitting device based on a voltage (hereinafter referred to as a gate-source voltage) applied between a gate electrode and a source electrode thereof. The amount of light emitted by the light emitting device and the luminance of a screen may be determined based on a pixel current.

Because a threshold voltage of a driving element determines a driving characteristic of a pixel, threshold voltages of driving elements in all pixels should be equal, but may differ between the pixels due to various causes such as a process deviation and a degradation characteristic deviation. Such a threshold voltage difference causes a luminance deviation between pixels, and as a result, there is a limitation in implementing a desired image.

Conventional technology for sensing and compensating for a threshold voltage difference between driving elements is available, but it is difficult to apply the conventional technology in real-time driving (i.e., display driving) where an input image is displayed.

The description provided in the discussion of the related art section should not be assumed to be prior art merely because it is mentioned in or associated with that section. The discussion of the related art section may include information that describes one or more aspects of the subject technology, and the description in this section does not limit the invention.

SUMMARY

To overcome the aforementioned problems and other disadvantages of the related art, the present disclosure may provide an electroluminescent display apparatus for sensing and compensating for a threshold voltage of a driving element in real-time driving.

To achieve these objects and other advantages and aspects of the present disclosure, as embodied and broadly described herein, in one or more aspects, an electroluminescent display apparatus may include a pixel including a driving element having a gate electrode connected to a data line and a source electrode connected to a reference voltage line and a pixel driving circuit for applying a sensing data voltage to the gate electrode of the driving element through the data line, detecting a source electrode voltage of the driving element, shifted from a sensing reference voltage based on the sensing data voltage, through the reference voltage line to obtain a detection voltage, calculating an offset voltage based on the detection voltage, and lowering a level of the sensing data voltage based on the offset voltage, in a plurality of vertical blank periods. The pixel driving circuit may apply an $n^{th}$ (where n is a natural number of 2 or more) sensing data voltage to the gate electrode of the driving element in a vertical blank period of an $n^{th}$ frame and may apply an $n-1^{th}$ sensing data voltage to the gate electrode of the driving element in a vertical blank period of an $n-1^{th}$ frame preceding the $n^{th}$ frame. The $n^{th}$ sensing data voltage may be lower than the $n-1^{th}$ sensing data voltage.

In one or more aspects of the present disclosure, an electroluminescent display apparatus may include a pixel including a driving element including a gate electrode connected to a data line and a source electrode connected to a reference voltage line and a pixel driving circuit for applying an $n^{th}$ (where n is a natural number of 2 or more) sensing data voltage to the gate electrode of the driving element through the data line, storing a source electrode voltage of the driving element, shifted from a sensing reference voltage based on the $n^{th}$ sensing data voltage, as an $n^{th}$ offset voltage, and calculating an $n^{th}$ detection voltage, which is lowered by the $n^{th}$ offset voltage, from the $n^{th}$ sensing data voltage. The pixel driving circuit may apply an $n-1^{th}$ sensing data voltage to the gate electrode of the driving element in a vertical blank period of an $n-1^{th}$ frame preceding the $n^{th}$ frame. The $n^{th}$ sensing data voltage may be lower than the $n-1^{th}$ sensing data voltage.

Other apparatuses, devices, methods, features and advantages will be, or will become, apparent to one with skill in the art upon examination of the following figures and detailed description. It is intended that all such additional apparatuses, devices, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles of the disclosure. In the drawings.

Figure 1:
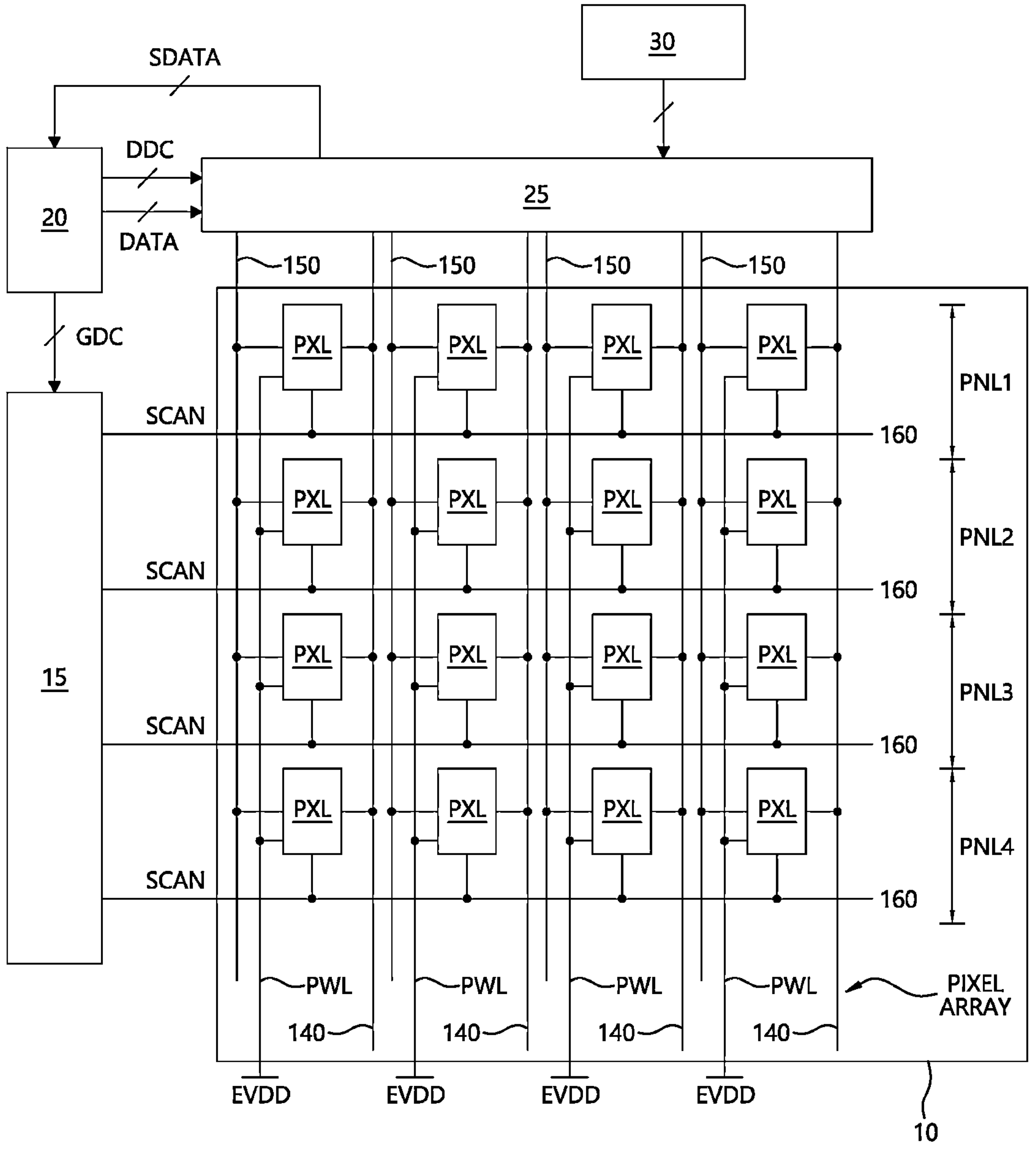
FIG. 1 is a diagram illustrating an electroluminescent display apparatus according to an example embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted for brevity. The progression of processing steps and/or operations described is an example; however, the sequence of steps and/or operations is not limited to that set forth herein and may be changed, with the exception of steps and/or operations necessarily occurring in a particular order.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are provided so that this disclosure is thorough and complete and fully conveys the scope of the present disclosure to those skilled in the art. Furthermore, the present disclosure is only defined by claims and their equivalents.

The shapes, sizes, areas, ratios, angles, numbers, and the like disclosed in the drawings for describing embodiments of the present disclosure are merely examples, and thus, the present disclosure is not limited to the illustrated details.

When the term “comprise,” “have,” “include,” “contain,” “constitute,” “make up of,” “formed of,” or the like is used, one or more other elements may be added unless a term such as “only” or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. The word “exemplary” is used to mean serving as an example or illustration. Embodiments are example embodiments. Aspects are example aspects. Any implementation described herein as an “example” is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, noise, or the like). Further, the term “may” encompasses all the meanings of the term “can.”

In describing a positional relationship, where the positional relationship between two parts is described, for example, using “on,” “over,” “under,” “above,” “below,” “beneath,” “near,” “close to,” or “adjacent to,” “beside,” “next to,” or the like, one or more other parts may be located between the two parts unless a more limiting term, such as “immediate(ly),” “direct(ly),” or “close(ly),” is used. For example, when a structure is described as being positioned “on,” “over,” “under,” “above,” “below,” “beneath,” “near,” “close to,” or “adjacent to,” “beside,” or “next to” another structure, this description should be construed as including a case in which the structures contact each other as well as a case in which one or more additional structures are disposed or interposed therebetween. Furthermore, the terms “front,” “rear,” “back,” “left,” “right,” “top,” “bottom,” “downward,” “upward,” “upper,” “lower,” “up,” “down,” “column,” “row,” “vertical,” “horizontal,” and the like refer to an arbitrary frame of reference.

In describing a temporal relationship, when the temporal order is described as, for example, “after,” “subsequent,” “next,” “before,” “preceding,” “prior to,” or the like, a case that is not consecutive or not sequential may be included unless a more limiting term, such as “just,” “immediate(ly),” or “direct(ly),” is used.

It is understood that, although the term “first,” “second,” or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. The terms "first," "second," and the like may be used to distinguish components from each other, but the functions or structures of the components are not limited by ordinal numbers or component names in front of the components.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element or layer is "connected," "coupled," or "adhered" to another element or layer, the element or layer can not only be directly connected, coupled, or adhered to another element or layer, but also be indirectly connected, coupled, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

The term "at least one" should be understood as including any and all combinations of one or more of the associated listed items. For example, the meaning of "at least one of a first item, a second item, and a third item" denotes the combination of items proposed from two or more of the first item, the second item, and the third item as well as only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise. In one or more aspects, unless stated otherwise, the term "nth" or "$n^{th}$" may refer to "nnd" or "$n^{nd}$" (e.g., 2nd where n is 2), or "nrd" or "$n^{rd}$" (e.g. 3rd where n is 3), and n may be a natural number.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

In one or more aspects, a pixel circuit provided on a substrate of a display panel may be implemented with a thin film transistor (TFT) having an n-type metal oxide semiconductor field effect transistor (MOSFET) structure, but is not limited thereto and may be implemented with a TFT having a p-type MOSFET structure. A TFT may be a three-electrode element which includes a gate, a source, and a drain. The source may be an electrode which supplies a carrier to a transistor. In the TFT, a carrier may start to flow from the source. The drain may be an electrode which enables the carrier to flow out from the TFT. That is, in a MOSFET, the carrier flows from the source to the drain. In the n-type TFT (NMOS), because a carrier is an electron, a source voltage may have a lower voltage than a drain voltage so that the electron flows from the source to the drain. In the n-type TFT, because the electron flows from the source to the drain, a current may flow from the drain to the source. On the other hand, in the p-type TFT (PMOS), because a carrier is a hole, a source voltage may be higher than a drain voltage so that the hole flows from the source to the drain. In the p-type TFT, because the hole flows from the source to the drain, a current may flow from the source to the drain. It should be noted that a source and a drain of a MOSFET are not fixed but switch therebetween. For example, the source and the drain of the MOSFET may switch therebetween.

Moreover, in one or more aspects of the present disclosure, a semiconductor layer of a TFT may be implemented with at least one of an oxide element, an amorphous silicon element, and a polysilicon element.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. In addition, for convenience of description, a scale, dimension, size, and thickness of each of the elements illustrated in the accompanying drawings may differ from an actual scale, dimension, size, and thickness, and thus, embodiments of the present disclosure are not limited to a scale, dimension, size, and thickness illustrated in the drawings.

Figure 2:
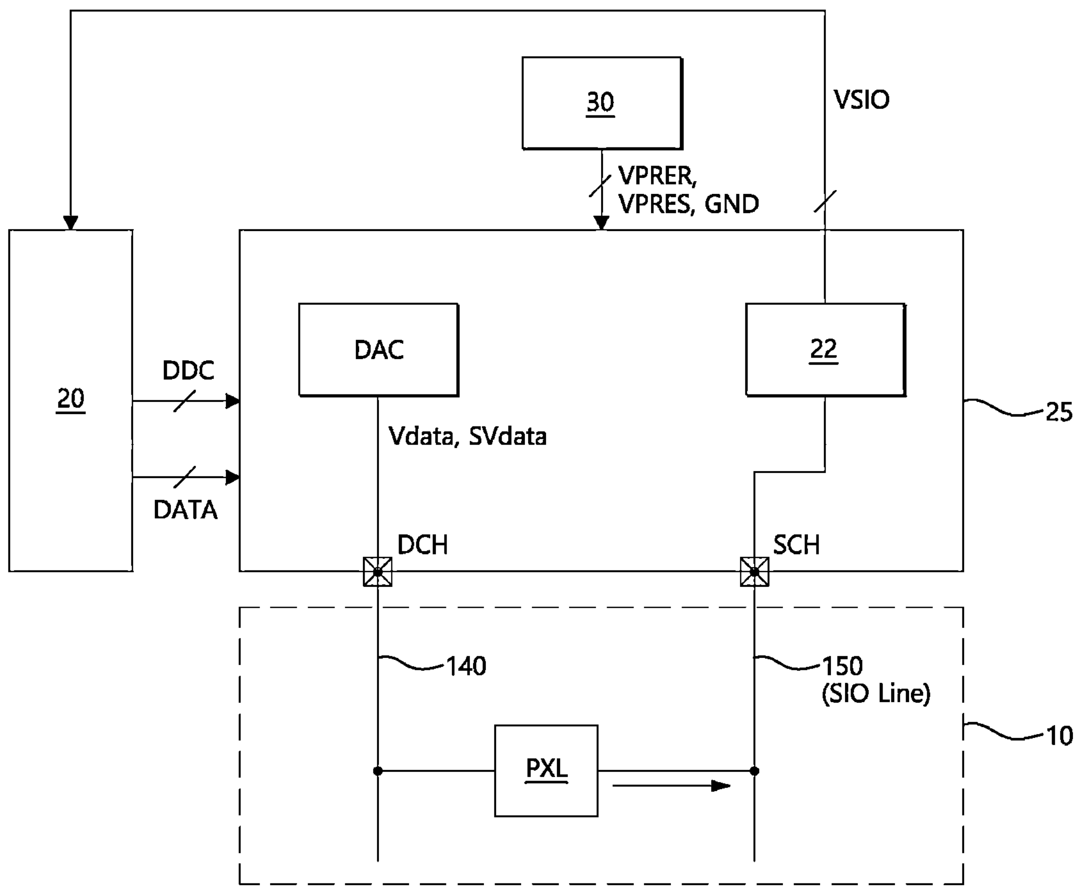
FIG. 2 is an example of a diagram illustrating a configuration of a data driver connected to a pixel array and a power circuit of FIG. 1.

FIG. 1 is a diagram illustrating an electroluminescent display apparatus according to an example embodiment of the present disclosure. FIG. 2 is a diagram illustrating a configuration of a data driver connected to a pixel array and a power circuit of FIG. 1.

Referring to FIGS. 1 and 2, the electroluminescent display apparatus according to an example embodiment of the present disclosure may include a display panel 10, a gate driving circuit 15, a timing controller 20, a data driving circuit 25, and a power circuit 30.

The display panel 10 may include a plurality of pixel lines PNL1 to PNL4, and each of the pixel lines PNL1 to PNL4 may include a plurality of pixels PXL and a plurality of signal lines. In one or more aspects, a "pixel line" is not a physical signal line and may denote a set of signal lines and pixels PXL adjacent to one another in an extension direction of a gate line. The signal lines may be connected to the pixels PXL. The signal lines may include a plurality of data lines 140 for supplying a display data voltage Vdata and a sensing data voltage SVdata to the pixels PXL, a plurality of reference voltage lines 150 for supplying a pixel reference voltage VPRER and a sensing reference voltage VPRES to the pixels PXL and reading offset voltages VSIO from the pixels PXL, a plurality of gate lines 160 for supplying a gate signal SCAN to the pixels PXL, and a plurality of high level power lines PWL for supplying a high level pixel voltage to the pixels PXL.

The pixels PXL of the display panel 10 may be arranged (e.g., as a matrix) to configure a pixel array. Each pixel PXL included in the pixel array may be connected to one of the data lines 140, one of the reference voltage lines 150, one of the high level power lines PWL, and one of the gate lines 160. Each pixel PXL may be further supplied with a low level pixel voltage from the power circuit 30.

The timing controller 20 may generate a gate timing control signal GDC for controlling a timing operation of the gate driving circuit 15 and a data timing control signal DDC for controlling a timing operation of the data driving circuit 25 with reference to timing signals (for example, a vertical synchronization signal Vsync, a horizontal synchronization signal Hsync, a dot clock signal DCLK, and a data enable signal DE) input from a host system.

The data timing control signal DDC may include a source start pulse, a source sampling clock, and a source output enable signal, but is not limited thereto. The gate timing control signal GDC may include a gate start signal and a gate shift clock, but is not limited thereto.

The timing controller 20 may control timing operations of the gate driving circuit 15 and the data driving circuit 25 to sense the driving characteristics of the pixels PXL in a vertical blank period of each frame, and in this case, the timing controller 20 may continuously sense a driving characteristic of the same pixel a plurality of times by using a plurality of vertical blank periods, thereby allowing a threshold voltage of a driving element included in each pixel PXL to be sensed and compensated for in real-time driving where an input image is displayed. A real-time sensing method according to the present example embodiment may be a method which repeatedly and continuously lowers the sensing data voltage SVdata which is to be applied to the same pixel, based on a previous sensing result with respect to the same pixel, and thus, senses a threshold voltage of a driving element included in the same pixel. According to the real-time sensing method, the accuracy of sensing may be enhanced, power consumption may be reduced, and a separate power off period for sensing a threshold voltage of a driving element may not be needed, thereby decreasing an off time. In addition, a threshold voltage of a driving element may be sensed and compensated for in real-time driving without needing to wait for an off time, and thus, display quality may be enhanced.

Here, the vertical blank period may be a period which is arranged between adjacent vertical active periods and where a display data voltage Vdata corresponding to image data DATA is not supplied to the pixels. The vertical active period may be a period where the image data DATA for an input video is converted into the display data voltage Vdata and is supplied to the pixels PXL.

The timing controller 20 may control a sensing driving timing and a display driving timing of the pixel lines PNL1 to PNL4 of the display panel 10 based on a predetermined sequence, and thus, may implement display driving and sensing driving. A display driving timing may correspond to the vertical active period, and a sensing driving timing may correspond to the vertical blank period.

The timing controller 20 may differently generate timing control signals GDC and DDC for display driving and timing control signals GDC and DDC for sensing driving.

Sensing driving may obtain a new sensing result from a corresponding pixel PXL whenever the sensing data voltage SVdata lower than a previous data voltage is repeatedly applied to a sensing target pixel PXL based on a previous sensing result and may detect, as a driving characteristic (i.e., a threshold voltage of a driving element) of a corresponding pixel PX, the sensing data voltage SVdata of when a variation of the new sensing result is 0 V. Sensing driving may further include an operation of updating a compensation value for compensating for a driving characteristic variation of the corresponding pixel PXL. The timing controller 20 may compensate for input image data DATA which is to be supplied to the corresponding pixel PXL, based on the compensation value, thereby preventing a degradation in image quality caused by a threshold voltage variation of a driving element.

Display driving may denote an operation which corrects digital image data DATA which is to be input to corresponding pixels PXL, based on the updated compensation value, and applies a display data voltage Vdata, corresponding to the corrected image data, to corresponding pixels PXL to display an input image.

The gate driving circuit 15 may be embedded in the display panel 10. The gate driving circuit 15 may be disposed in a non-display area (a bezel area) outside a display area where the pixel array is provided.

The gate driving circuit 15 may include a plurality of gate stages connected to the gate lines 160 of the pixel array. The gate stages may generate the gate signal SCAN for controlling switch elements of the pixels PXL and may supply the gate signal to the gate lines 160. In display driving, the gate signal SCAN may be for selecting one pixel line to which the display data voltage Vdata is to be supplied. In sensing driving, the gate signal SCAN may be for selecting one pixel line to which the sensing data voltage SVdata is to be supplied.

The data driving circuit 25 may include a data voltage generating circuit DAC and a sensing circuit 22.

The data voltage generating circuit DAC may be connected to each data line 140 through each data channel DCH. The data voltage generating circuit DAC may be implemented as a digital-to-analog converter (DAC) which converts a digital signal into an analog signal. The data voltage generating circuit DAC may generate the sensing data voltage SVdata needed for sensing driving and the display data voltage Vdata needed for display driving and supplies the sensing data voltage SVdata and the display data voltage Vdata to the pixel PXL through the data lines 140.

The sensing circuit 22 may be connected to the reference voltage lines 150 through each sensing channel SCH. The sensing circuit 22 may include a reference voltage circuit, a sampling circuit, and an analog-to-digital converter (see FIG. 3), or may include a reference voltage circuit, a sampling circuit, an offset storage circuit, a calculation circuit, and an analog-to-digital converter (see FIG. 8).

The sensing circuit 22 may supply the display reference voltage VPRER to the pixels PXL through the reference voltage lines 150 in display driving. In sensing driving, the sensing circuit 22 may supply the sensing reference voltage VPRES to the pixels PXL through the reference voltage lines 150.

Figure 3:
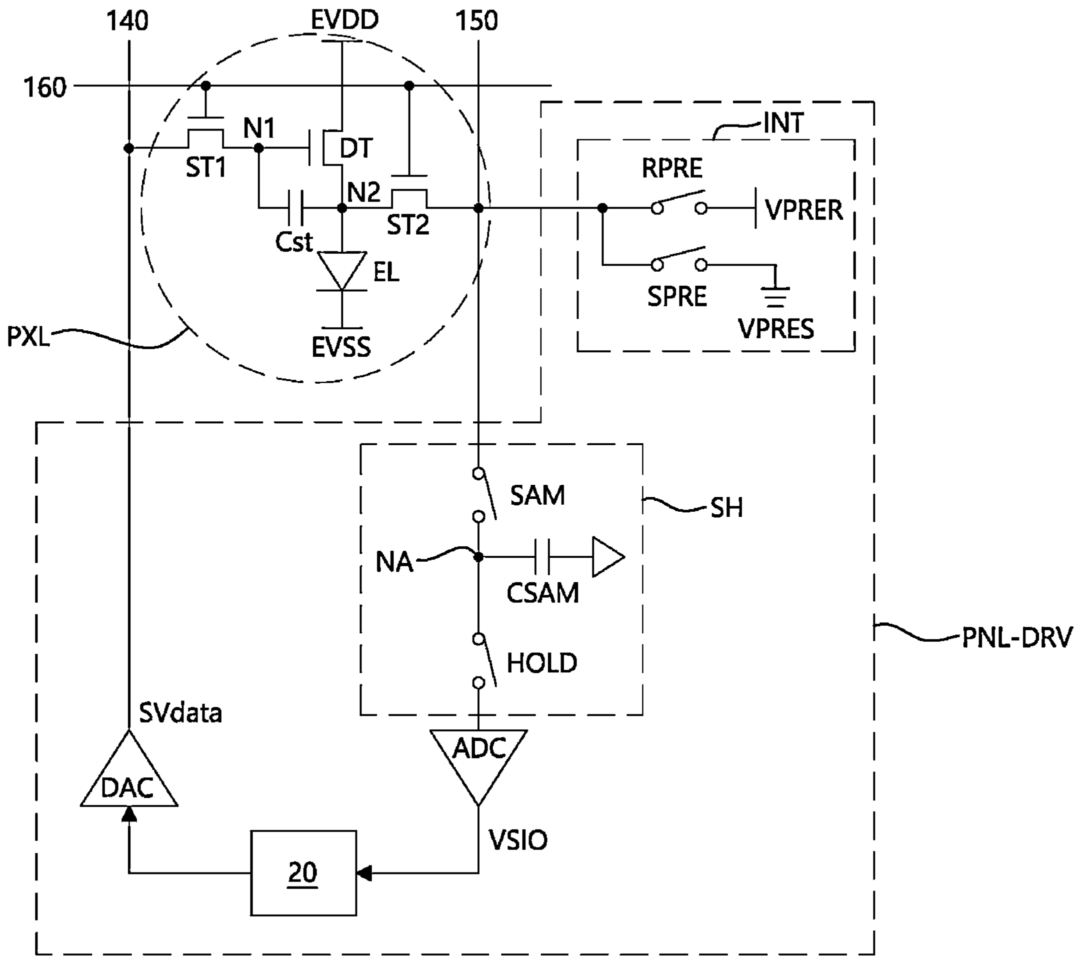
FIG. 3 is an example of a diagram illustrating a connection configuration between a pixel driving circuit and a pixel for sensing a threshold voltage of a driving element included in a pixel.

In sensing driving, the sensing circuit 22 may detect source electrode voltages of driving elements, which are shifted to different levels, as detection voltages from the sensing reference voltage through the reference voltage lines 150 based on the sensing data voltages SVdata having different levels in a plurality of vertical blank periods (see FIG. 3).

Figure 8:
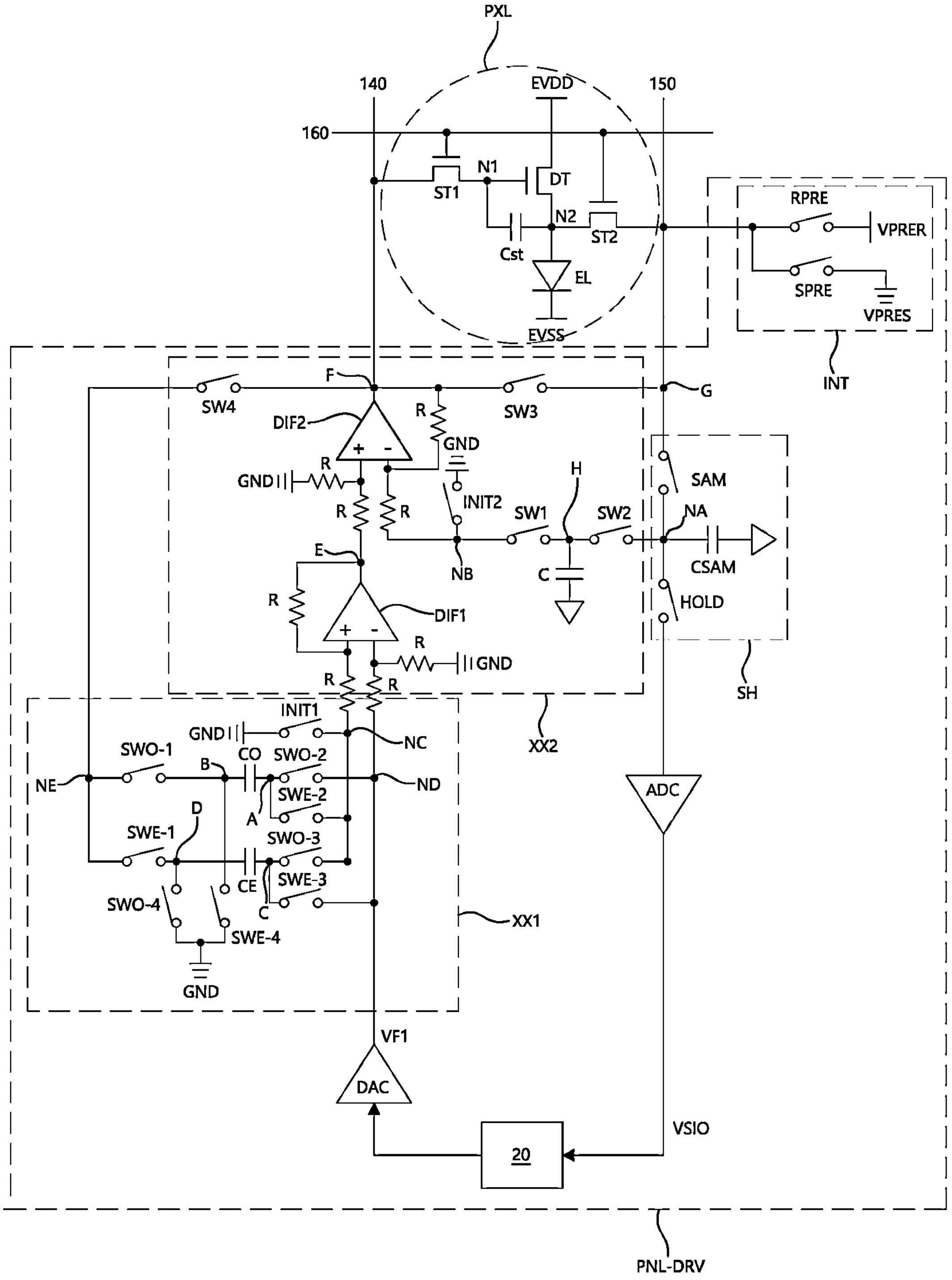
FIG. 8 is an example of a diagram illustrating another connection configuration between a pixel driving circuit and a pixel for sensing a threshold voltage of a driving element included in a pixel.

In sensing driving, the sensing circuit 22 may detect and store source electrode voltages of driving elements, which are shifted to different levels, as offset voltages from the sensing reference voltage through the reference voltage lines 150 based on the sensing data voltages SVdata having different levels in a plurality of vertical blank periods (see FIG. 8)

The power circuit 30 may generate a high level pixel voltage and a low level pixel voltage, which are to be supplied to the pixels PXL. In addition, the power circuit 30 may generate the display reference voltage VPRER, the sensing reference voltage VPRES, and a ground voltage GND, which are to be supplied to the sensing circuit 22. In order to satisfy a driving characteristic of a pixel PXL and a sensing range of the sensing circuit 22, the display reference voltage VPRER may be higher than the sensing reference voltage VPRES. The sensing reference voltage VPRES may have the same voltage level as the ground voltage GND, but is not limited thereto.

First Example Embodiment

FIG. 3 is an example of a diagram illustrating a connection configuration between a pixel driving circuit and a pixel for sensing a threshold voltage of a driving element included in a pixel.

Referring to FIG. 3, a pixel PXL may include a light emitting device EL, a driving thin film transistor (TFT) DT, a plurality of switch TFTs ST1 and ST2, and a storage capacitor Cst. The driving TFT DT and the switch TFTs ST1 and ST2 may each be implemented an NMOS transistor, but are not limited thereto.

The light emitting device EL may emit light with a pixel current supplied from the driving TFT DT. The light emitting device EL may be implemented with an organic light emitting diode including an organic emission layer, or may be implemented with an inorganic light emitting diode including an inorganic emission layer. An anode electrode of the light emitting device EL may be connected to a source node N2, and a cathode electrode may be connected to an input terminal for a low level pixel voltage EVSS.

The driving TFT DT may be a driving element which generates the pixel current based on a gate-source voltage thereof. A gate electrode of the driving TFT DT may be connected to a gate node N1, a first electrode may be connected to an input terminal for a high level pixel voltage EVDD through a high level power line PWL, and a second electrode may be connected to a source node N2.

The switch TFTs ST1 and ST2 may be switch elements which set the gate-source voltage of the driving TFT DT and connect the first electrode of the driving TFT DT to the data line 14 or connect the second electrode of the driving TFT DT to the reference voltage line 150.

The first switch TFT ST1 may be connected between the data line 140 and the gate node N1 and may be turned on based on the gate signal SCAN from the gate line 160. The first switch TFT ST1 may be turned on in display driving or sensing driving. When the first switch TFT ST1 is turned on, the display data voltage Vdata or the sensing data voltage SVdata may be applied to the gate node N1. A gate electrode of the first switch TFT ST1 may be connected to the gate line 160, a first electrode thereof may be connected to the data line 140, and a second electrode thereof may be connected to the gate node N1.

The second switch TFT ST2 may be connected between the reference voltage line 150 and the source node N2 and may be turned on based on the gate signal SCAN from the gate line 160. The second switch TFT ST2 may be turned on in display driving or sensing driving and may apply the display reference voltage VPRER or the sensing reference voltage VPRES to the source node N2. The second switch TFT ST2 may be turned on in sensing driving and may connect the source node N2 to the reference voltage line 150, and thus, a voltage of the source node N2 in which a driving characteristic of the driving TFT DT is reflected may be charged into the reference voltage line 150. A gate electrode of the second switch TFT ST2 may be connected to the gate line 160, a first electrode thereof may be connected to the reference voltage line 150, and a second electrode thereof may be connected to the source node N2.

The storage capacitor Cst may be connected between the gate node N1 and the source node N2 and may hold the gate-source voltage of the driving TFT DT in display driving or sensing driving.

The pixel PXL may allow the light emitting device EL to emit light with a first pixel current based on a voltage difference between the display data voltage Vdata and the display reference voltage VPRER in display driving, and thus, may display an input image. In addition, the pixel PXL may allow the source node N2 and the reference voltage line 150 to be charged with a second pixel current based on a voltage difference between the sensing data voltage SVdata and the sensing reference voltage VPRES in display driving. In sensing driving, the light emitting device EL may not emit light.

The pixel PXL may be connected to a pixel driving circuit PNL-DRV for sensing driving.

The pixel driving circuit PNL-DRV may include a reference voltage circuit INT, a sampling circuit SH, an analog-to-digital converter ADC, a timing controller 20, and a data voltage generating circuit DAC, and may further include a gate driving circuit (not shown) described above.

The reference voltage circuit INT may include a first reference voltage switch RPRE for supplying the display reference voltage VPRER to the reference voltage line 150 and a second reference voltage switch SPRE for supplying the sensing reference voltage VPRES to the reference voltage line 150. The first reference voltage switch RPRE may be turned on in display driving and may maintain an off state in sensing driving. The second reference voltage switch SPRE may be turned on in sensing driving and may maintain an off state in display driving.

The sampling circuit SH may sample a voltage (a detection voltage) of the reference voltage line 150 in which a source node voltage of the pixel PXL is reflected, in sensing driving. The sampling circuit SH may be configured with a sampling switch SAM, a sampling capacitor CSAM, and a holding circuit SH. The sampling switch SAM may be connected between the reference voltage line 150 and a node NA, the sampling capacitor CSAM may be connected to the node NA at one electrode, and the holding switch SH may be connected between the node NA and the analog-to-digital converter ADC.

The analog-to-digital converter ADC may convert an output of the sampling circuit SH into a digital detection voltage VSIO and may supply the digital detection voltage VSIO to the timing controller 20.

The timing controller 20 may perform a digital operation needed for sensing driving based on the digital detection voltage VSIO. In detail, the timing controller 20 may calculate a digital offset voltage based on the digital detection voltage VSIO. The timing controller 20 may previously store a digital level of the sensing reference voltage VPRES and a digital level of the sensing data voltage SVdata supplied in a current vertical blank period. The timing controller 20 may calculate a difference between the detection voltage VSIO and the sensing reference voltage VPRES as a digital offset voltage. When the digital offset voltage is greater than 0 V, the timing controller 20 may decrease, by the digital offset voltage, a digital level of the sensing data voltage SVdata which is to be supplied in a subsequent vertical blank period and may supply the decreased sensing data voltage SVdata to the data voltage generating circuit DAC. Therefore, the data voltage generating circuit DAC may generate a sensing data voltage SVdata lowered by the offset voltage in sensing driving performed in the subsequent vertical blank period and may supply the generated sensing data voltage SVdata to the pixel PXL.

Moreover, when the digital offset voltage is 0 V (i.e., when the detection voltage VSIO is equal to the sensing reference voltage VPRES), the timing controller 20 may determine a level of the sensing data voltage SVdata, supplied in the current vertical blank period, as a threshold voltage level of a driving element and may stop a sensing operation of a corresponding pixel PXL.

In sensing driving, an operation of the pixel driving circuit PNL-DRV is briefly described below.

In a vertical blank period of an $n-1^{th}$ frame, the reference voltage circuit INT may output the sensing reference voltage VPRES to the reference voltage line 150, the data voltage generating circuit DAC may output an $n-1^{th}$ sensing data voltage SVdata to the data line 140, and the sampling circuit SH may sample an $n-1^{th}$ detection voltage VSIO through the reference voltage line 150. Then, the timing controller 20 may subtract the sensing reference voltage VPRES from the $n-1^{th}$ detection voltage VSIO to calculate an $n-1^{th}$ offset voltage and may calculate an $n^{th}$ sensing data voltage SVdata lowered by an $n-1^{th}$ offset voltage from the $n-1^{th}$ sensing data voltage SVdata.

Subsequently, in a vertical blank period of an $n^{th}$ frame, the reference voltage circuit INT may output the sensing reference voltage VPRES to the reference voltage line 150, the data voltage generating circuit DAC may output the $n^{th}$ sensing data voltage SVdata to the data line 140, and the sampling circuit SH may sample an $n^{th}$ detection voltage VSIO through the reference voltage line 150. Then, the timing controller 20 may subtract the sensing reference voltage VPRES from the $n^{th}$ detection voltage VSIO to calculate an $n^{th}$ offset voltage. For example, when the $n^{th}$ offset voltage is 0 V, the timing controller 20 may detect the $n^{th}$ sensing data voltage as a threshold voltage of a driving element. In one or more examples, n may be a natural number.

Figure 4:
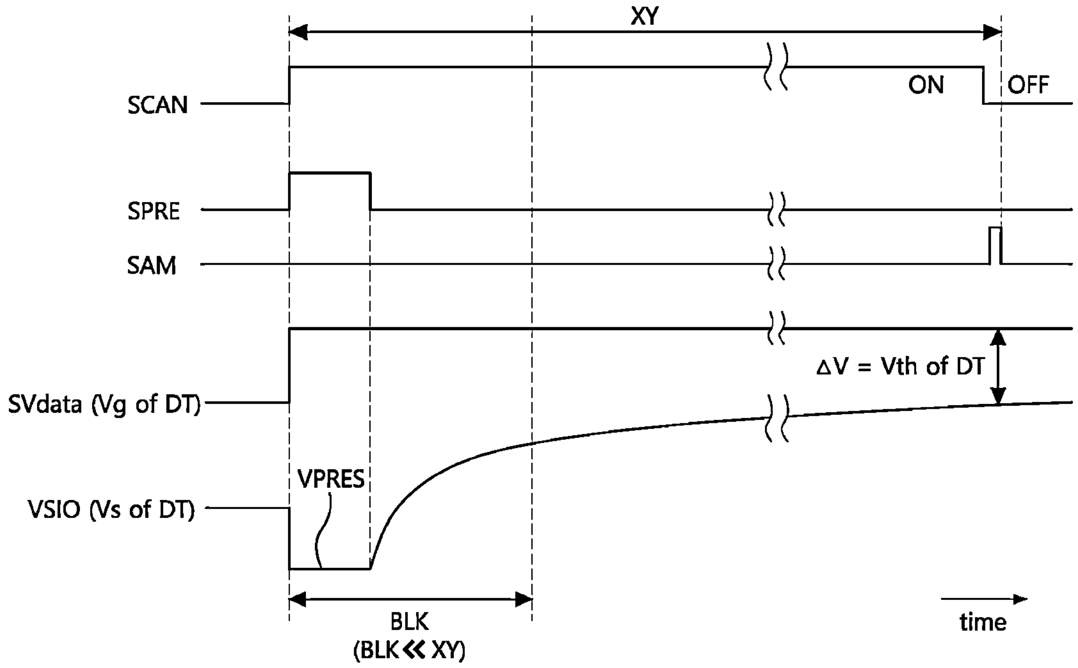
FIG. 4 is a diagram showing a driving waveform for implementing a conventional technology concept in a comparative example for sensing-driving a pixel driving circuit of FIG. 3.

FIG. 4 is a diagram showing a driving waveform for implementing a conventional technology concept in a comparative example for sensing-driving a pixel driving circuit of FIG. 3.

Referring to FIG. 4, in the conventional technology concept, a driving element DT may operate based on a source follower scheme until a gate-source voltage difference ΔV of the driving element DT is a threshold voltage Vth of the driving element DT. To this end, a sensing data voltage SVdata may be supplied to a gate electrode of the driving element DT, and a sensing reference voltage VPRES may be supplied to a source electrode of the driving element DT. A voltage Vs of a source node may increase toward a voltage Vg of a gate node based on a pixel current flowing in the driving element DT, and such a source following operation may be performed continuously until the gate-source voltage difference ΔV of the driving element DT is the threshold voltage Vth of the driving element DT (i.e., until the driving element DT is turned off).

According to the conventional technology concept, the voltage Vg of the gate node may be fixed by the sensing data voltage SVdata having a fixed level, and in this state, because the voltage Vs of the source node increases gradually toward the voltage Vg of the gate node, a sensing time XY taken until the gate-source voltage difference ΔV of the driving element DT is the threshold voltage Vth of the driving element DT may be long. Because the sensing time XY is far longer than a vertical blank period BLK, it may be difficult to apply the conventional technology concept in real-time driving (i.e., display driving) where an input image is displayed.

Figure 5A:
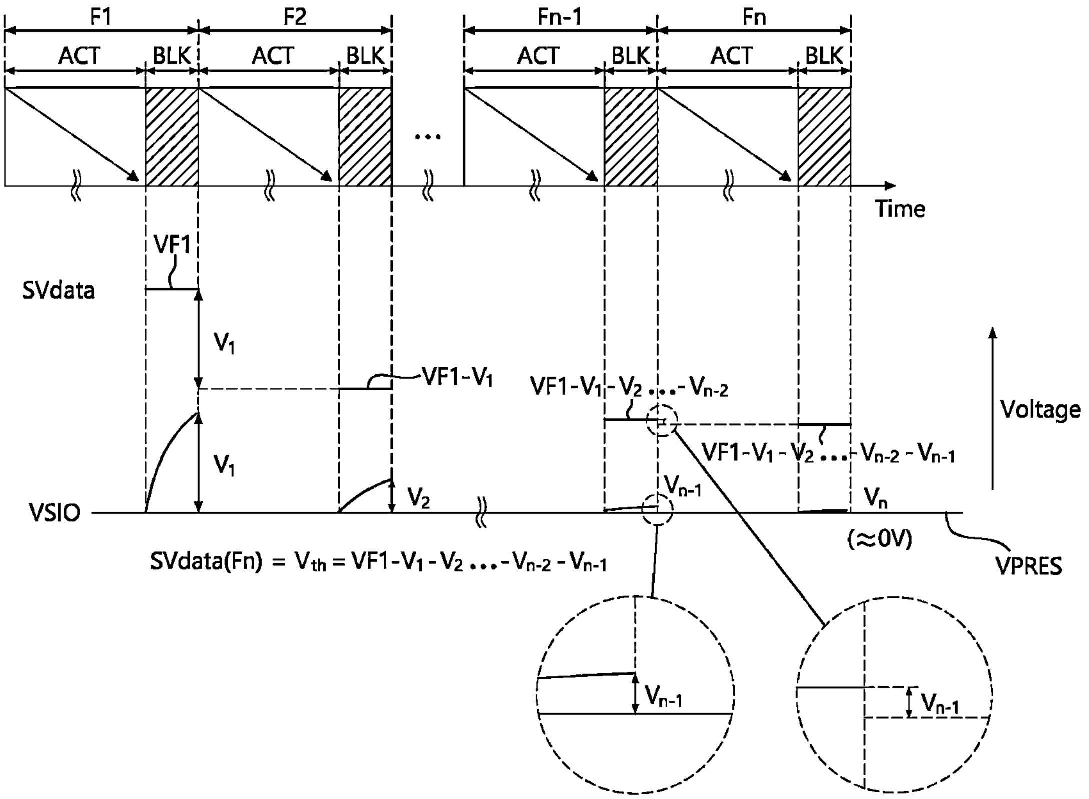
FIGS. 5A and 5B are diagrams showing a technology implementation for sensing a threshold voltage of a driving element, in an example embodiment for sensing-driving the pixel driving circuit of FIG. 3.
Figure 5B:
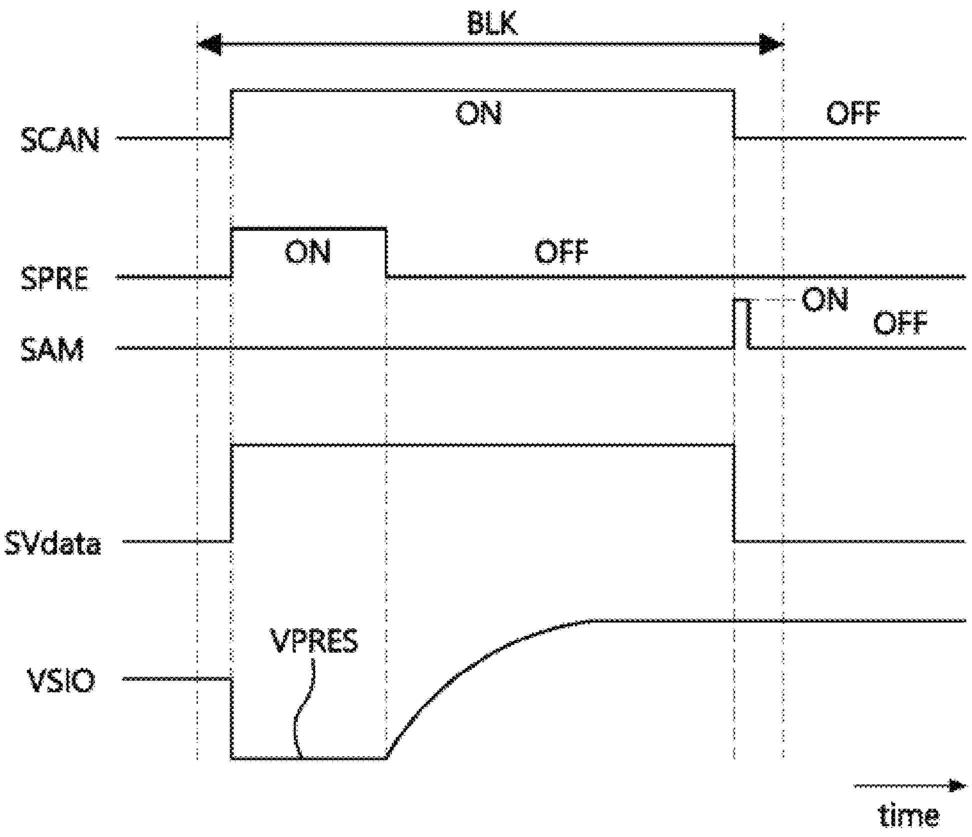

FIGS. 5A and 5B are diagrams showing a technology implementation for sensing a threshold voltage of a driving element, in an example embodiment for sensing-driving the pixel driving circuit of FIG. 3.

The technology implementation of the present example embodiment may be on the pixel PXL and the pixel driving circuit PNL-DRV of FIG. 3. Referring to FIG. 5A, by using a plurality of vertical blank periods BLK, the pixel driving circuit PNL-DRV may repeat sensing driving as in FIG. 5 until a threshold voltage Vth of a corresponding pixel PXL is detected. The pixel driving circuit PNL-DRV may accumulate offset voltages V1 to Vn whenever sensing driving is repeated and may lower a level of a sensing data voltage SVdata by an accumulated offset voltage. The pixel driving circuit PNL-DRV may supply a corresponding pixel PXL with a sensing data voltage SVdata lowered by a previous offset voltage whenever sensing driving is repeated, and thus, may repeatedly obtain a new sensing result VSIO. The new sensing result VSIO may be reduced as sensing driving is repeated, and thus, the pixel driving circuit PNL-DRV may detect, as a driving characteristic of a corresponding pixel PXL (i.e., a threshold voltage of a driving element), a sensing data voltage SVdata of when a variation of the new sensing result VSIO is 0 V.

According to the technology implementation of the present example embodiment, an $n^{th}$ sensing data voltage SVdata(Fn) applied to a gate electrode of a driving element in a vertical blank period BLK of an $n^{th}$ frame Fn may be lower than an $n-1^{th}$ sensing data voltage SVdata(Fn−1) applied to the gate electrode of the driving element in a vertical blank period BLK of an $n-1^{th}$ frame Fn−1 preceding the $n^{th}$ frame.

Moreover, an n−1$^{th}$ detection voltage VSIO detected through a reference voltage line 150 in the vertical blank period BLK of the n−1$^{th}$ frame Fn−1 may increase by an n−1$^{th}$ offset voltage Vn−1 from a sensing reference voltage VPRES, and an n$^{th}$ detection voltage VSIO detected through the reference voltage line 150 in the vertical blank period BLK of the n$^{th}$ frame Fn may increase by an n$^{th}$ offset voltage Vn, which is lower than the n−1$^{th}$ offset voltage Vn−1, from the sensing reference voltage VPRES. Accordingly, the n$^{th}$ sensing data voltage SVdata(Fn) may be the n−1$^{th}$ offset voltage Vn−1 lower than the n−1$^{th}$ sensing data voltage SVdata(Fn−1).

The n$^{th}$ sensing data voltage SVdata(Fn) may have a voltage level of "VF1−$\Sigma_n^{n-1}$(offsetvoltage)". Here, the "VF1" may be a first sensing data voltage SVdata(F1) applied to a gate electrode of a driving element DT in a vertical blank period BLK of a first frame F1, and the "$\Sigma_n^{n-1}$(offsetvoltage)" may be an accumulated offset voltage obtained by summating offset voltages V1 to Vn−1 up to a vertical blank period BLK of an n−1$^{th}$ frame Fn−1 from the vertical blank period BLK of the first frame F1.

A timing at which a variation of a new sensing result VSIO is 0 V may be a time at which a level of a new offset voltage is 0 V. For example, when an n$^{th}$ offset voltage Vn is 0 V, the n$^{th}$ sensing data voltage SVdata(Fn) may be detected as a threshold voltage Vth of a driving element. In this case, a threshold voltage Vth detection value may be "VF1−(V1+V2+Vn−1)".

Figure 6:
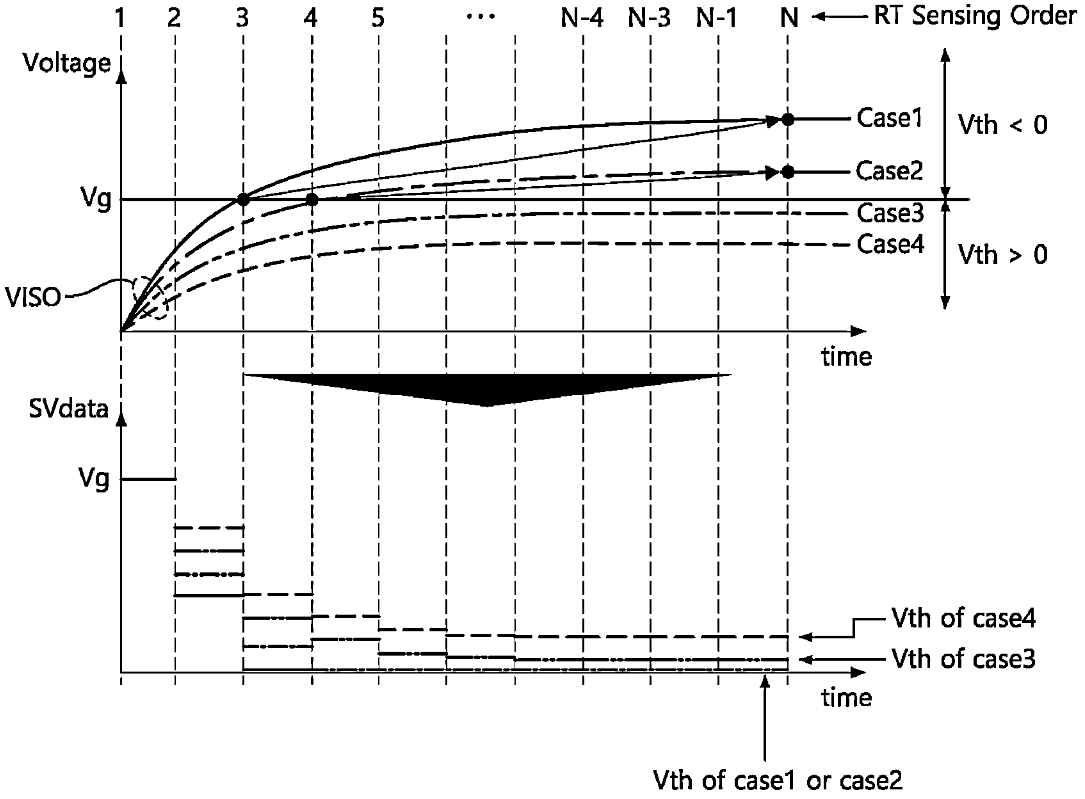
FIGS. 6 and 7 are diagrams showing an application example of a technology implementation of the present disclosure based on a threshold voltage level of a driving element.
Figure 7:
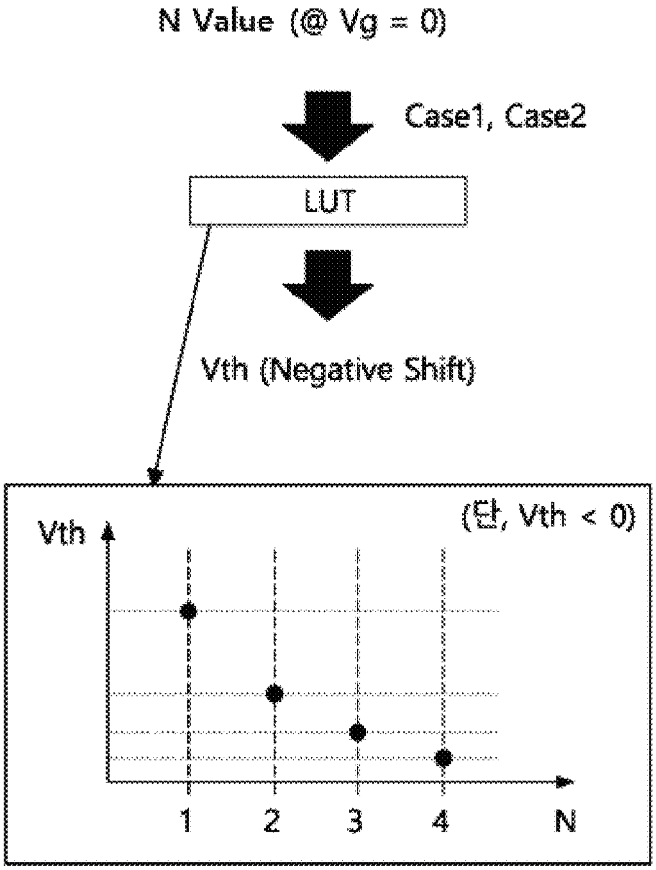

FIGS. 6 and 7 are diagrams showing an application example of a technology implementation of the present disclosure based on a threshold voltage level of a driving element.

Referring to FIG. 6, a threshold voltage Vth of a driving element may vary in a negative direction as in cases 1 and 2, or may vary in a positive direction as in cases 3 and 4. Threshold voltage levels of the cases 1 to 4 may differ. In an example technology implementation of the present disclosure, as shown in FIG. 6, a sensing result may be obtained by supplying a sensing data voltage to a gate electrode of the driving element while lowering the sensing data voltage, and in this case, a sensing data voltage of when there is no variation of the sensing result may be detected as the threshold voltage Vth of the driving element.

An output allowable range of the data voltage generating circuit DAC may be a positive voltage of 0 V or more. The data voltage generating circuit DAC may not output a negative voltage. In the cases 3 and 4 where the threshold voltage Vth of the driving element is a positive voltage, because a sensing data voltage detected as the threshold voltage Vth of the driving element is detected at different levels within a positive voltage range of more than 0 V, the example technology implementation of the present disclosure may be intactly applied. On the other hand, in the cases 1 and 2 where the threshold voltage Vth of the driving element is a negative voltage, because a sensing data voltage detected as the threshold voltage Vth of the driving element is saturated as the same 0 V, the example technology implementation of the present disclosure may be intactly applied. When the example technology implementation of the present disclosure is intactly applied to the cases 1 and 2, an accurate threshold voltage may not be detected.

In order to solve such a problem, when the threshold voltage Vth of the driving element is 0 V or less as in the cases 1 and 2, the pixel driving circuit PNL-DRV may obtain a specific sensing data voltage of when a sensing result is not changed, convert the specific sensing data voltage into a lower estimation sensing data voltage than the specific sensing data voltage by using a predetermined lookup table LUT, and detect the estimation sensing data voltage as the threshold voltage Vth of the driving element. In the lookup table LUT, a level of the estimation sensing data voltage may be differently set based on a time (an N value of FIG. 7) at which the specific sensing data voltage is 0 V. For example, because a time at which the specific sensing data voltage is 0 V is earlier in the case 1 than the case 2, an estimation sensing data voltage of the case 1 may be set to be lower than an estimation sensing data voltage of the case 2.

In one or more examples, a value of n may vary from 1 to N (see FIG. 6) where N may be a natural number. As the value of n is reduced, the estimation sensing data voltage may be set to be relatively low. In one or more examples, when n is a first value, the estimation sensing data voltage may be set to a first voltage value. When n is a second value, the estimation sensing data voltage may be set to a second voltage value. In this regard, when the first value may be lower than the second value, the first voltage value is lower than the second voltage value.

Second Example Embodiment

FIG. 8 is an example of a diagram illustrating another connection configuration between a pixel driving circuit and a pixel for sensing a threshold voltage of a driving element included in a pixel. A pixel PXL configuration of FIG. 8 may be substantially the same as that described with respect to FIG. 3. However, a pixel driving circuit PNL-DRV of FIG. 8 may have a different configuration than that of FIG. 3.

Referring to FIG. 8, a pixel PXL may be connected to the pixel driving circuit PNL-DRV, for sensing driving.

By using a plurality of vertical blank periods, the pixel driving circuit PNL-DRV of FIG. 8 may repeat sensing driving until a threshold voltage of a corresponding pixel PXL is detected. The pixel driving circuit PNL-DRV may accumulate and store offset voltages through an analog operation whenever sensing driving is repeated and may lower a level of a sensing data voltage by an accumulated offset voltage through the analog operation. The pixel driving circuit PNL-DRV may supply a corresponding pixel PXL with a sensing data voltage lowered by a previous offset voltage whenever sensing driving is repeated, and thus, may repeatedly obtain a new sensing result VSIO. The new sensing result VSIO may be reduced as sensing driving is repeated, and thus, the pixel driving circuit PNL-DRV may detect, as a driving characteristic of a corresponding pixel PXL (i.e., a threshold voltage of a driving element), a sensing data voltage of when a variation of the new sensing result VSIO is 0 V. The pixel driving circuit PNL-DRV of FIG. 3 may accumulate offset voltages through a digital operation and may lower a level of a sensing data voltage by an accumulated offset voltage through the digital operation, but there may be a difference in that pixel driving circuit PNL-DRV of FIG. 8 performs the analog operation by using an additional analog circuit included in the data driving circuit 25. Because the pixel driving circuit PNL-DRV of FIG. 8 lowers a level of the sensing data voltage through the analog operation, a side effect such as digital noise caused by the digital operation may be prevented.

A sensing operation of a pixel driving circuit PNL-DRV including an analog operation is briefly described below. In a vertical blank period of an n$^{th}$ (where n is a natural number of 2 or more) frame, the pixel driving circuit PNL-DRV may apply an n$^{th}$ sensing data voltage to a gate electrode of a driving element DT through a data line 140, store a source electrode voltage of the driving element DT, shifted from a sensing reference voltage VPRES based on an $n^{th}$ sensing data voltage, as an $n^{th}$ offset voltage, and calculate an $n^{th}$ detection voltage, which is lower than the $n^{th}$ offset voltage, from the $n^{th}$ sensing data voltage. Here, the $n^{th}$ sensing data voltage may be lower than an $n-1^{th}$ sensing data voltage applied to the gate electrode of the driving element DT in a vertical blank period of an $n-1^{th}$ frame preceding the $n^{th}$ frame.

The $n-1^{th}$ sensing data voltage based on an analog operation may have a level of "$VF1-\Sigma_n^{n-2}$(offsetvoltage)", and the $n^{th}$ sensing data voltage may have a level of "$VF1-\Sigma_n^{n-1}$(offsetvoltage)". Here, the "VF1" may be a start sensing data voltage applied to the gate electrode of the driving element DT, the "$\Sigma_n^{n-1}$(offsetvoltage)" may be a first accumulated offset voltage obtained by summating offset voltages up to a vertical blank period of the $n-1^{th}$ frame, and the "$\Sigma_n^{n-2}$(offsetvoltage)" may be a second accumulated offset voltage obtained by summating offset voltages up to a vertical blank period of an $n-2^{th}$ frame preceding the $n-1^{th}$ frame. In this case, the first accumulated offset voltage may be higher than the second accumulated offset voltage.

The pixel driving circuit PNL-DRV may calculate the $n^{th}$ sensing data voltage as an $n-1^{th}$ detection voltage VSIO in the vertical blank period of the $n-1^{th}$ frame. The pixel driving circuit PNL-DRV may compare the $n^{th}$ detection voltage and an $n-1^{th}$ detection voltage through a digital operation, and when the $n^{th}$ detection voltage is equal to the $n-1^{th}$ detection voltage, the pixel driving circuit PNL-DRV may detect the $n^{th}$ detection voltage as a threshold voltage of a driving element.

To this end, the pixel driving circuit PNL-DRV may include a reference voltage circuit INT, a sampling circuit SH, an analog-to-digital converter ADC, a timing controller 20, a data voltage generating circuit DAC, an offset storage circuit XX1, and an analog operation circuit XX2. The pixel driving circuit PNL-DRV may further include a gate driving circuit (not shown) described above.

The reference voltage circuit INT may include a first reference voltage switch RPRE for supplying a display reference voltage VPRER to a reference voltage line 150 and a second reference voltage switch SPRE for supplying a sensing reference voltage VPRES to the reference voltage line 150. The first reference voltage switch RPRE may be turned on in display driving, and in sensing driving, may maintain an off state. The second reference voltage switch SPRE may be turned on in sensing driving, and in display driving, may maintain an off state.

The sampling circuit SH may sample a voltage (a detection voltage) of the reference voltage line 150 in which a source node voltage of a pixel PXL is reflected, in sensing driving. The sampling circuit SH may be configured with a sampling switch SAM, a sampling capacitor CSAM, and a holding switch HOLD. The sampling switch SAM may be connected between a nod NA and a node G connected to the reference voltage line 150, the sampling capacitor CSAM may be connected to the node NA at one electrode thereof, and the holding switch HOLD may be connected between the node NA and the analog-to-digital converter ADC.

The analog-to-digital converter ADC may convert an output of the sampling circuit SH into a digital detection voltage VSIO and may supply the digital detection voltage VSIO to a timing controller 20.

The timing controller 20 may perform a digital operation needed for sensing driving based on the digital detection voltage VSIO. In detail, the timing controller 20 may compare a current detection voltage (for example, the $n^{th}$ detection voltage) with a previous detection voltage (for example, the $n-1^{th}$ detection voltage) and may repeat sensing driving until the current detection voltage is equal to the previous detection voltage. That is, the timing controller 20 may compare the $n^{th}$ detection voltage with the $n-1^{th}$ detection voltage, and when the $n^{th}$ detection voltage is equal to the $n-1^{th}$ detection voltage, the timing controller 20 may detect the $n^{th}$ detection voltage as a threshold voltage of a driving element and may end sensing driving.

The data voltage generating circuit DAC may generate a start sensing data voltage VF1 in a vertical blank period of each frame where sensing driving is performed and may supply the start sensing data voltage VF1 to the offset storage circuit XX1.

The offset storage circuit XX1 may include an odd capacitor CO and an even capacitor CE. The offset storage circuit XX1 may detect an accumulated offset voltage up to a corresponding time whenever sensing driving is repeated in a vertical blank period of each frame and may alternately store the accumulated offset voltage in the odd capacitor CO and the even capacitor CE.

The offset storage circuit XX1 may include an odd capacitor CO connected between a node A and a node B, an even capacitor CE connected between a node C and a node D, a first odd switch SWO-1 connected between a node NE and the node B, a first even switch SWE-1 connected between the node NE and the node D, a second odd switch SWO-2 connected between the node A and a node ND to which the start sensing data voltage is applied, a second even switch SWE-2 connected between a node NC and the node A, a third odd switch SWO-3 connected between the node NC and the node C, a third even switch SWE-3 connected between the node ND and the node C, a fourth odd switch SWO-4 connected between the node D and a ground voltage source GND, a fourth even switch SWE-4 connected between the node B and the ground voltage source, and a first initialization switch INIT1 connected between the node NC and the ground voltage source GND.

The analog operation circuit XX2 may output an $n^{th}$ sensing data voltage, obtained by subtracting the first accumulated offset voltage from a start sensing data voltage VF1, to a data line 140, detect and store the $n^{th}$ offset voltage, and subtract the $n^{th}$ offset voltage from the $n^{th}$ sensing data voltage to calculate the $n^{th}$ detection voltage.

The analog operation circuit XX2 may include a first subtractor DIF1 and a second subtractor DIF2. The first subtractor DIF1 may include a first non-inverting input terminal (+) connected to the node NC, a first inverting input terminal (−) connected to the node ND, and a first output terminal connected to a node E. The second subtractor DIF2 may include a second non-inverting input terminal (+) connected to the node E, a second inverting input terminal (−) connected to a node NB, and a second output terminal connected to the data line 140 through a node F.

Moreover, the analog operation circuit XX2 may include a second initialization switch INIT2 connected between the node NB and the ground voltage source GND, a first switch SW1 connected between the node NB and a node H, a capacitor C connected to the node H, a second switch SW2 connected between the node H and the node NA, a third switch SW2 connected between the node F and the node G connected to the reference voltage line 150, and a fourth switch SW4 connected between the node NE and the node F.

Figure 9:
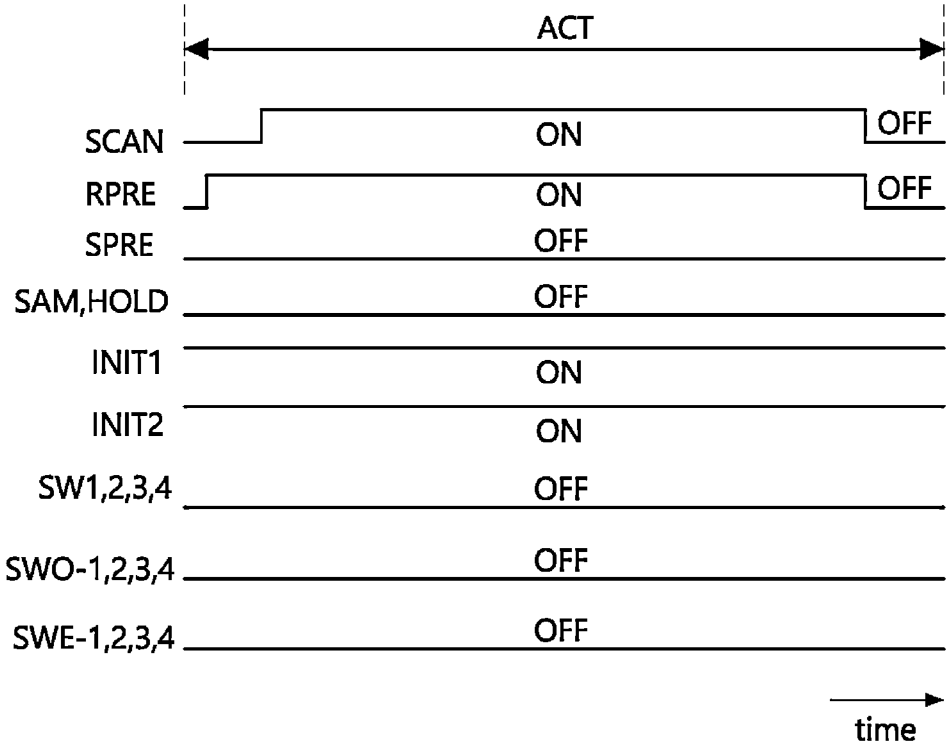
FIG. 9 is an example of a diagram showing a driving waveform for display-driving the pixel driving circuit of FIG. 8 in vertical active periods of a plurality of frames.

FIG. 9 is an example of a diagram showing a driving waveform for display-driving the pixel driving circuit of FIG. 8 in vertical active periods of a plurality of frames.

In order to display-drive the pixel driving circuit PNL-DRV of FIG. 8, a switch RPRE and first and second initialization switches INIT1 and INIT2 may be turned on based on a scan signal SCAN in a vertical active period ACT. As the first and second initialization switches INIT1 and INIT2 are turned on, a display data voltage generated by a data voltage generating circuit DAC may pass through an analog operation circuit XX2 and may be applied to a gate node N1 of a driving element DT. At this time, a display reference voltage VPRER may be applied to a source node N2 of the driving element DT through the switch RPRE. Then, a pixel current proportional to a difference voltage between the display data voltage and the display reference voltage VPRER may flow in the driving element DT, and based on such a pixel current, a light emitting device EL may emit light, whereby an image may be implemented with brightness corresponding to a gray level of the display data voltage.

Furthermore, all of the switches SPRE, SAM, HOLD, SW1,2,3,4, SWO-1,2,3,4, and SWE-1,2,3,4 may be turned off in display driving.

Figure 10A:
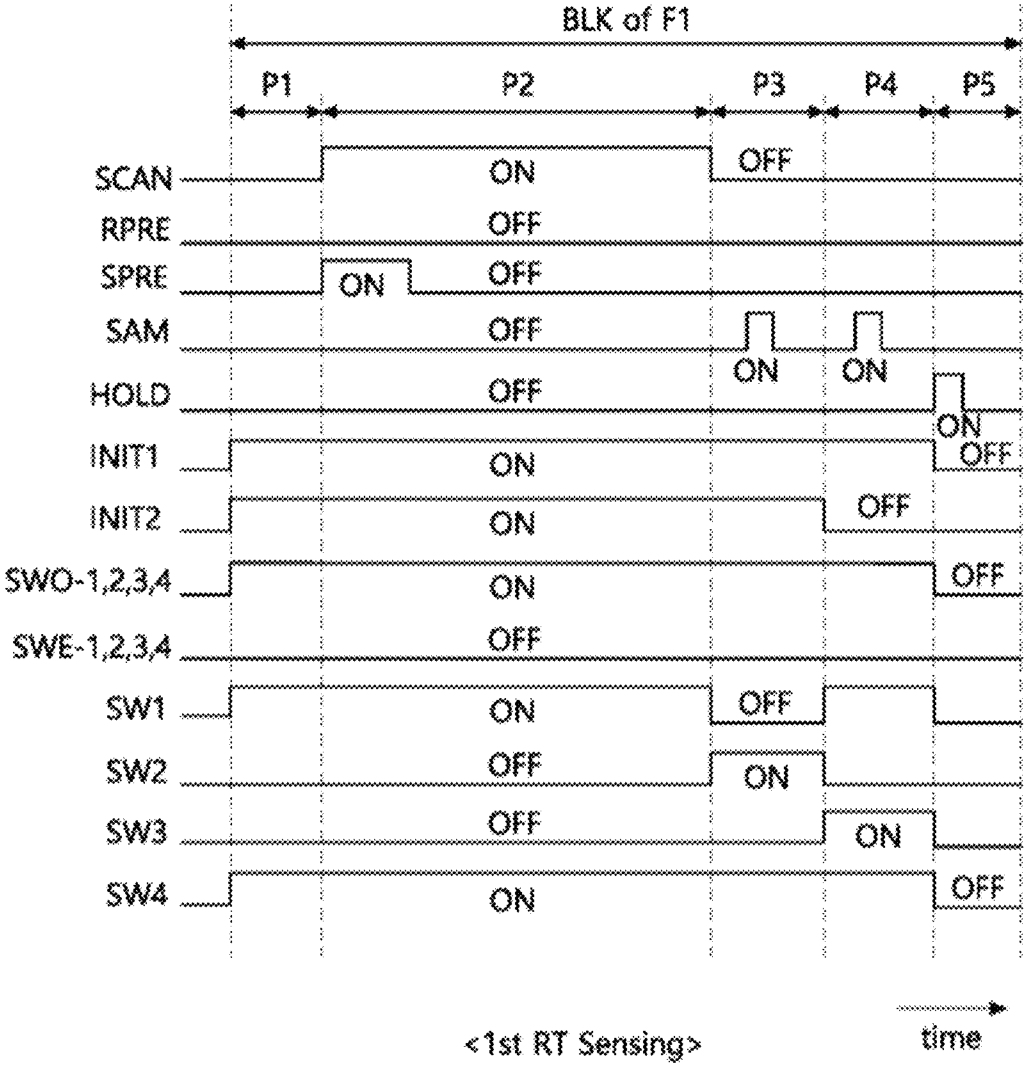
FIGS. 10A and 10B are examples of diagrams showing a node voltage variation and a driving waveform for first-sensing-driving the pixel driving circuit of FIG. 8 in a vertical active period of a first frame.
Figure 10B:
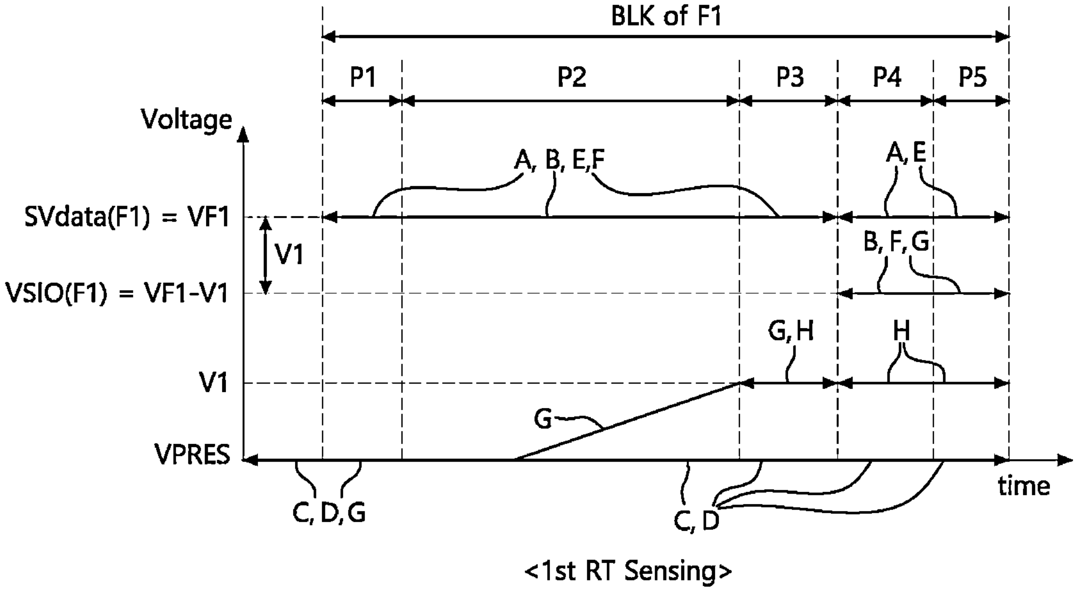

FIGS. 10A and 10B are examples of diagrams showing a node voltage variation and a driving waveform for first-sensing-driving the pixel driving circuit PNL-DRV of FIG. 8 in a vertical active period BLK of a first frame F1.

Referring to FIGS. 10A and 10B, first sensing driving may be performed through first to fifth periods P1 to P5.

In the first period P1, a first initialization switch INIT1 and third and fourth odd switches SWO-3 and SWO-4 of an offset storage circuit XX1 may be turned on, and thus, an even capacitor CE may be reset.

In the second period P2, a pixel current 1 proportional to "start sensing data voltage VF1–sensing reference voltage VPRES" may flow in a driving element DT of a pixel PXL. A voltage of a node G connected to a source node of the driving element DT may increase by a first offset voltage V1, based on the pixel current 1.

In the third period P3, the node G may be connected to a capacitor C of an analog operation circuit XX2, and the first offset voltage V1 which is a voltage of the node G may be stored in the capacitor C. Accordingly, a voltage of a node H connected to the capacitor C may be the first offset voltage V1.

In the fourth period P4, a subtraction operation between the start sensing data voltage VF1 and the first offset voltage V1 may be performed by a second subtractor DIF2 of the analog operation circuit XX2, and a voltage of a node F connected to an output terminal of the second subtractor DIF2 may be "VF1–V1". In addition, "VF1–V1" which is the voltage of the node F may be supplied to a node B of the offset storage circuit XX1 through a fourth switch SW4 and a first odd switch SWO-1. At this time, the start sensing data voltage VF1 has been already supplied to a node A of the offset storage circuit XX1. Accordingly, the first offset voltage V1 may be stored in the odd capacitor CO between the node A and the node B. In addition, "VF1–V1" which is a voltage of a node F may be supplied to a node G through a third switch SW3.

In the fifth period P5, "VF1–V1" which is a voltage of the node G may be sampled by the sampling circuit SH and may be output as a first detection voltage VSIO to the timing controller 20.

Figure 11A:
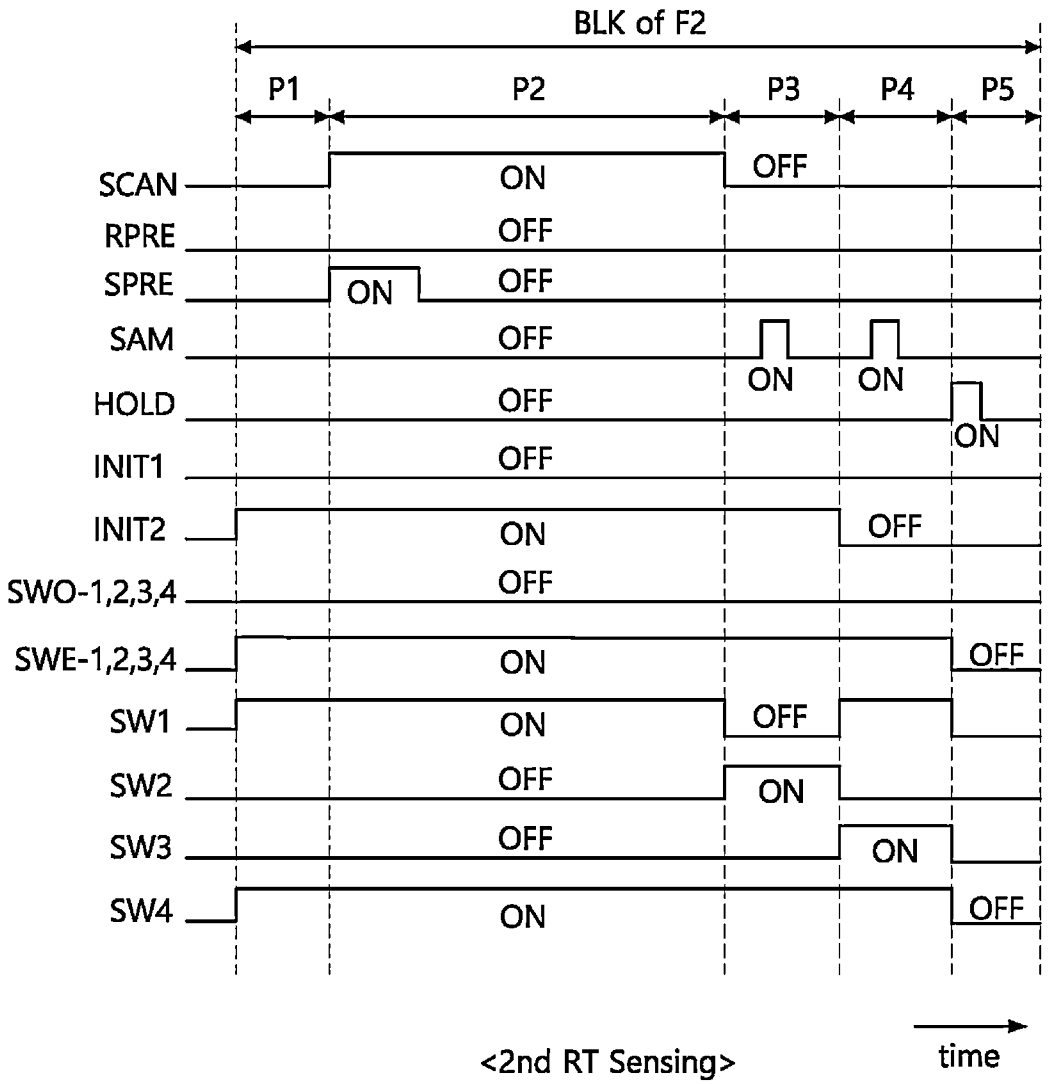
FIGS. 11A and 11B are examples of diagrams showing a node voltage variation and a driving waveform for second-sensing-driving the pixel driving circuit of FIG. 8 in a vertical active period of a second frame.
Figure 11B:
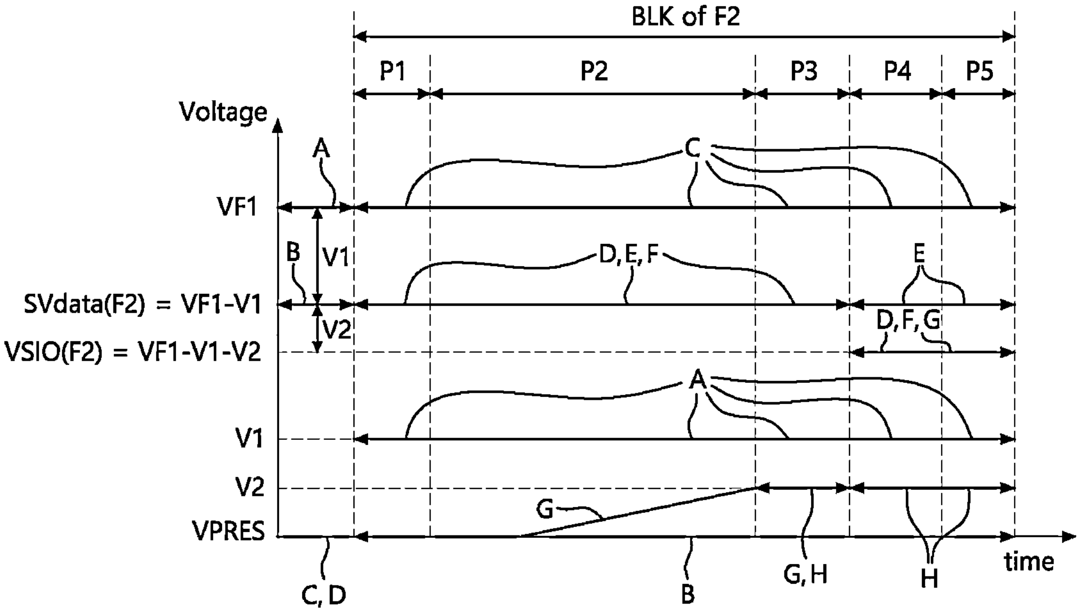

FIGS. 11A and 11B are examples of diagrams showing a node voltage variation and a driving waveform for second-sensing-driving the pixel driving circuit of FIG. 8 in a vertical active period of a second frame.

Referring to FIGS. 11A and 11B, second sensing driving may be performed through first to fifth periods P1 to P5.

In the first period P1, as first to fourth even switches SWE-1 to SWE-4 of an offset storage circuit XX1 is turned on, "VF1" may be applied to a node C and "VF1–V1" may be applied to a node D, and thus, a first offset voltage V1 may be stored in an even capacitor CE of the offset storage circuit XX1 connected to the node C and the node D. At this time, the odd capacitor CO of the offset storage circuit XX1 may hold a first offset voltage V1 stored in a vertical blank period of a first frame.

In the second period P2, a pixel current 2 proportional to "(VF1–V1)–VPRES" may flow in a driving element DT of a pixel PXL. A voltage of a node G connected to a source node of the driving element DT may increase by a second offset voltage V2, based on the pixel current 2. Here, the pixel current 2 may be lower than the pixel current 1 described above, and thus, the second offset voltage V2 may be lower than the first offset voltage V1 described above.

In the third period P3, the node G may be connected to a capacitor C of an analog operation circuit XX2, and the second offset voltage V2 which is a voltage of the node G may be stored in the capacitor C. Accordingly, a voltage of a node H connected to the capacitor C may be the second offset voltage V2.

In the fourth period P4, a subtraction operation between "VF1–V1" and the first offset voltage V1 may be performed by a second subtractor DIF2 of the analog operation circuit XX2, and a voltage of a node F connected to an output terminal of the second subtractor DIF2 may be "VF1–V1–V2". In addition, "VF1–V1–V2" which is the voltage of the node F may be supplied to a node D of the offset storage circuit XX1 through a fourth switch SW4 and a first even switch SWE-1. At this time, a start sensing data voltage VF1 has been already supplied to a node C of the offset storage circuit XX1. Accordingly, an accumulated offset voltage "V1+V2" obtained by summating the first offset voltage V1 and the second offset voltage V2 may be stored in the even capacitor CE between the node C and the node D. In addition, "VF1–V1–V2" which is a voltage of a node F may be supplied to a node G through a third switch SW3.

In the fifth period P5, "VF1–V1–V2" which is a voltage of the node G may be sampled by the sampling circuit SH and may be output as a second detection voltage VSIO to the timing controller 20.

Figure 12:
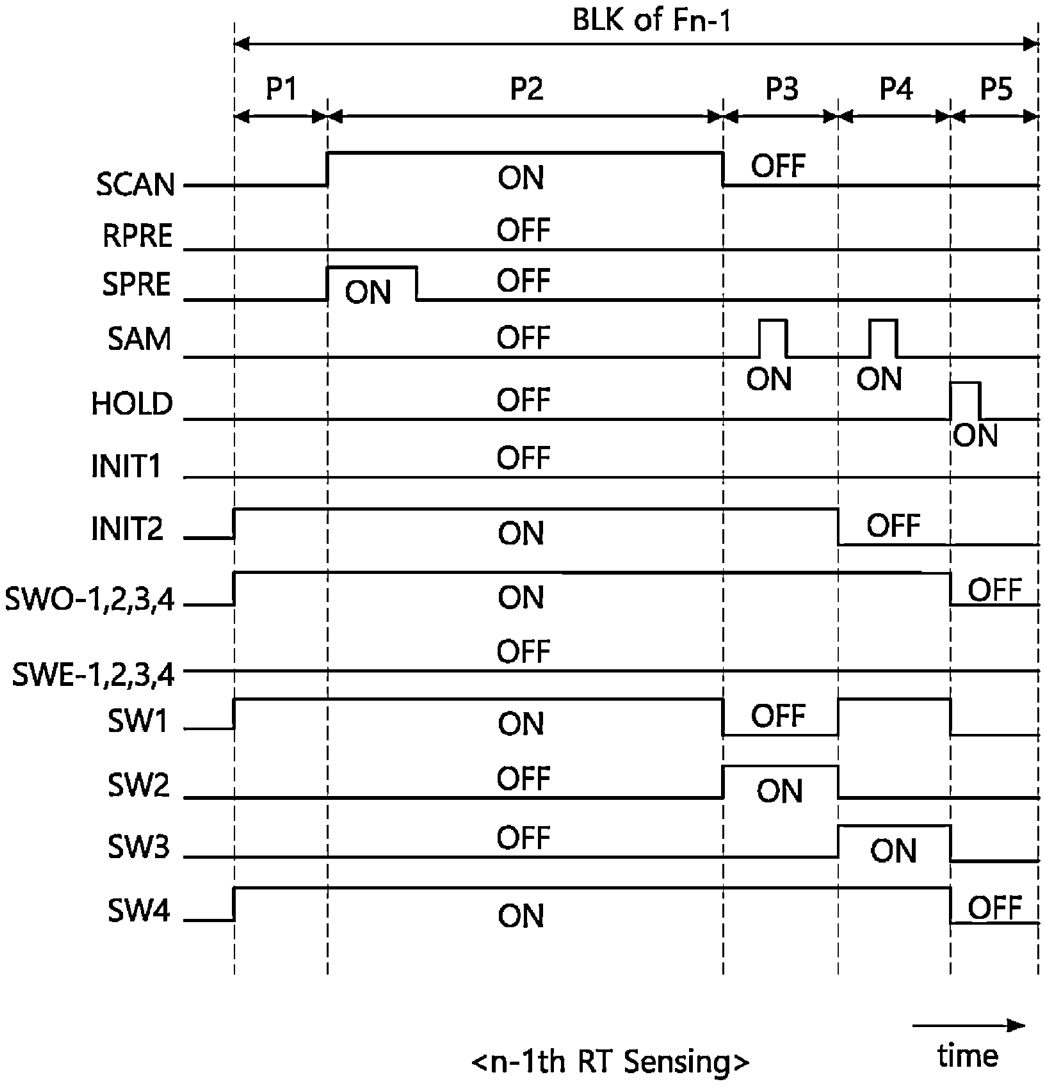
FIG. 12 is an example of a diagram showing a driving waveform for $(n-1)^{th}$-sensing-driving the pixel driving circuit of FIG. 8 in a vertical active period of an $n-1^{th}$ frame.

FIG. 12 is an example of a diagram showing a driving waveform for $(n-1)^{th}$-sensing-driving the pixel driving circuit of FIG. 8 in a vertical active period of an $n-1^{th}$ frame.

Referring to FIG. 12, $(n-1)^{th}$ sensing driving may be performed through first to fifth periods P1 to P5. Through $(n-1)^{th}$ sensing driving, an $n-1^{th}$ offset voltage Vn–1 may be stored in a capacitor C, and a voltage of a node F may be "VF1–V1–V2– . . . –Vn–1", based on a second subtractor DIF2 of an analog operation circuit XX2. An accumulated offset voltage "V1+V2+ . . . +Vn–1" may be stored in an odd capacitor CO of an offset storage circuit XX1. In addition, "VF1–V1–V2– . . . –Vn–1" which is a voltage of a node G may be sampled by the sampling circuit SH and may be output as an $n-1^{th}$ detection voltage VSIO to the timing controller 20.

Figure 13:
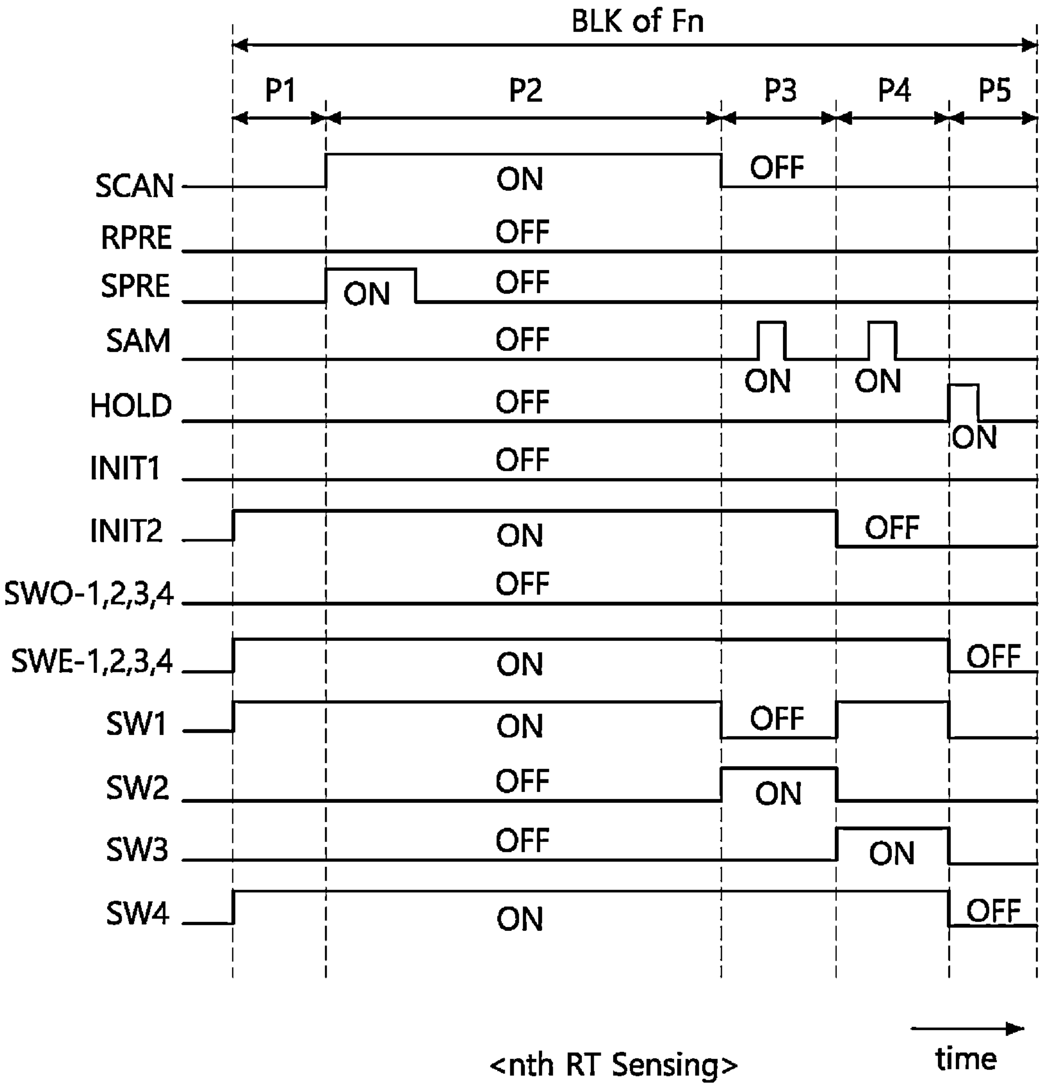
FIG. 13 is an example of a diagram showing a driving waveform for $n^{th}$-sensing-driving the pixel driving circuit of FIG. 8 in a vertical active period of an $n^{th}$ frame.

FIG. 13 is an example of a diagram showing a driving waveform for $n^{th}$-sensing-driving the pixel driving circuit of FIG. 8 in a vertical active period of an $n^{th}$ frame.

Referring to FIG. 13, $n^{th}$ sensing driving may be performed through first to fifth periods P1 to P5. Through $n^{th}$ sensing driving, an $n^{th}$ offset voltage Vn may be stored in a capacitor C, and a voltage of a node F may be "VF1–V1–

V2− . . . −Vn−1", based on a second subtractor DIF2 of an analog operation circuit XX2. An accumulated offset voltage "V1+V2+ . . . +Vn−1+Vn" may be stored in an odd capacitor CO of an offset storage circuit XX1. In addition, "VF1−V1−V2− . . . −Vn−1−Vn" which is a voltage of a node G may be sampled by the sampling circuit SH and may be output as an $n^{th}$ detection voltage VSIO to the timing controller 20.

In the present example embodiment, the same pixel may be continuously sensed a plurality of times by using a plurality of vertical blank periods, and thus, a threshold voltage of a driving element included in each pixel may be sensed and compensated for in real-time driving where an input image is displayed.

In the present example embodiment, a sensing data voltage to be applied to a same pixel may be repeatedly and continuously lowered based on a previous sensing result with respect to the same pixel, and thus, a threshold voltage of a driving element included in the same pixel may be sensed. According to the present example embodiment, the accuracy of sensing may be enhanced, power consumption may be reduced, and a separate power off period for sensing a threshold voltage of a driving element may not be needed, thereby decreasing an off time. In addition, a threshold voltage of a driving element may be sensed and compensated for in real-time driving without needing to wait for an off time, and thus, display quality may be enhanced.

The effects according to the present disclosure are not limited to the above examples, and other various effects may be within the scope of the present disclosure.

While the present disclosure has been particularly shown and described with reference to exemplary embodiments thereof, it will be understood by those of ordinary skill in the art that various modifications and variations in form and details may be made without departing from the spirit and scope of the present disclosure. Thus, it is intended that the present disclosure covers the modifications and variations of this disclosure provided they come within the scope of the appended claims and their equivalents.

What is claimed is:

1. An electroluminescent display apparatus comprising:

a pixel including a driving element having a gate electrode connected to a data line and a source electrode connected to a reference voltage line; and a pixel driving circuit for applying a sensing data voltage to the gate electrode of the driving element through the data line, detecting a source electrode voltage of the driving element, shifted from a sensing reference voltage based on the sensing data voltage, through the reference voltage line to obtain a detection voltage, calculating an offset voltage based on the detection voltage, and lowering a level of the sensing data voltage based on the offset voltage, in a plurality of vertical blank periods, wherein:

the pixel driving circuit is configured to apply an $n^{th}$ (where n is a natural number of 2 or more) sensing data voltage to the gate electrode of the driving element in a vertical blank period of an $n^{th}$ frame;

the pixel driving circuit is configured to apply an $n-1^{th}$ sensing data voltage to the gate electrode of the driving element in a vertical blank period of an $n-1^{th}$ frame preceding the $n^{th}$ frame; and the $n^{th}$ sensing data voltage is lower than the $n-1^{th}$ sensing data voltage.

2. The electroluminescent display apparatus of claim 1, wherein:

the pixel driving circuit is configured to detect an $n-1^{th}$ detection voltage through the reference voltage line in the vertical blank period of the $n-1^{th}$ frame and to increase the $n-1^{th}$ detection voltage by an $n-1^{th}$ offset voltage from the sensing reference voltage;

the pixel driving circuit is configured to detect an $n^{th}$ detection voltage through the reference voltage line in the vertical blank period of the $n^{th}$ frame and to increase the $n^{th}$ detection voltage by an $n^{th}$ offset voltage from the sensing reference voltage;

the $n^{th}$ offset voltage is lower than the $n-1^{th}$ offset voltage; and the $n^{th}$ sensing data voltage is lower than the $n-1^{th}$ sensing data voltage by the $n-1^{th}$ offset voltage.

3. The electroluminescent display apparatus of claim 2, wherein, when the $n^{th}$ offset voltage is 0 V, the pixel driving circuit detects the $n^{th}$ sensing data voltage as a threshold voltage of the driving element.

4. The electroluminescent display apparatus of claim 2, wherein the $n^{th}$ sensing data voltage has a voltage level of "VF1$-\Sigma_n^{n-1}$(offsetvoltage)", and the "VF1" is a first sensing data voltage applied to the gate electrode of the driving element in a vertical blank period of a first frame, and the "$\Sigma_n^{n-1}$(offsetvoltage)" is an accumulated offset voltage obtained by summating offset voltages up to the vertical blank period of the $n-1^{th}$ frame from the vertical blank period of the first frame.

5. The electroluminescent display apparatus of claim 4, wherein the pixel driving circuit comprises:

a reference voltage circuit for outputting the sensing reference voltage to the reference voltage line in the vertical blank period of the $n-1^{th}$ frame;

a sampling circuit for sampling the $n-1^{th}$ detection voltage through the reference voltage line in the vertical blank period of the $n-1^{th}$ frame;

a timing controller for subtracting the sensing reference voltage from the $n-1^{th}$ detection voltage to calculate the $n-1^{th}$ offset voltage and calculating the $n^{th}$ sensing data voltage which is lower by the $n-1^{th}$ offset voltage than the $n-1^{th}$ sensing data voltage; and a digital-to-analog converter for outputting the $n-1^{th}$ sensing data voltage to the data line in the vertical blank period of the $n-1^{th}$ frame and outputting the $n^{th}$ sensing data voltage to the data line in the vertical blank period of the $n^{th}$ frame.

6. The electroluminescent display apparatus of claim 5, wherein, in the vertical blank period of the $n^{th}$ frame, the reference voltage circuit is configured to output the sensing reference voltage to the reference voltage line, the sampling circuit is configured to sample the $n^{th}$ detection voltage input through the reference voltage line, and the timing controller is configured to subtract the sensing reference voltage from the $n^{th}$ detection voltage to calculate the $n^{th}$ offset voltage, and when the $n^{th}$ offset voltage is 0 V, the timing controller detects the $n^{th}$ sensing data voltage as a threshold voltage of the driving element.

7. The electroluminescent display apparatus of claim 1, wherein, when a threshold voltage of the driving element is higher than 0 V, the pixel driving circuit detects the $n^{th}$ sensing data voltage as the threshold voltage of the driving element.

8. The electroluminescent display apparatus of claim 1, wherein, when a threshold voltage of the driving element is lower than or equal to 0 V, the pixel driving circuit detects an estimation sensing data voltage, different from the $n^{th}$ sensing data voltage, as the threshold voltage of the driving element, and the estimation sensing data voltage is differently set based on a time at which the $n^{th}$ sensing data voltage is 0 V.

9. The electroluminescent display apparatus of claim 8, wherein:

when n is a first value, the estimation sensing data voltage is set to a first voltage value;

when n is a second value, the estimation sensing data voltage is set to a second voltage value; and when the first value is lower than the second value, the first voltage value is lower than the second voltage value.

* * * * *